United States Patent
Shi et al.

(10) Patent No.: US 11,939,679 B2
(45) Date of Patent: Mar. 26, 2024

(54) METHOD FOR PREPARING AN ANTICORROSIVE SURFACE LAYER OF A METAL MATERIAL IN A MARINE ENVIRONMENT BY LASER

(71) Applicant: Guangdong Ocean University, Zhanjiang (CN)

(72) Inventors: Wenqing Shi, Zhanjiang (CN); Fenju An, Zhanjiang (CN); Jiang Huang, Zhanjiang (CN); Yuping Xie, Zhanjiang (CN); Zhanxia Wu, Zhanjiang (CN); Zhigang Liang, Zhanjiang (CN); Jinming Zhan, Zhanjiang (CN); Jinyu Huang, Zhanjiang (CN); Yi Ba, Zhanjiang (CN)

(73) Assignee: GUANGDONG OCEAN UNIVERSITY, Zhanjiang (CN)

( * ) Notice: Subject to any disclaimer, the term of this patent is extended or adjusted under 35 U.S.C. 154(b) by 0 days.

(21) Appl. No.: 17/262,952

(22) PCT Filed: Aug. 12, 2020

(86) PCT No.: PCT/CN2020/108661
§ 371 (c)(1),
(2) Date: Jan. 25, 2021

(87) PCT Pub. No.: WO2021/179533
PCT Pub. Date: Sep. 16, 2021

(65) Prior Publication Data
US 2022/0402581 A1    Dec. 22, 2022

(30) Foreign Application Priority Data
Mar. 7, 2020    (CN) .......................... 202010154137.8

(51) Int. Cl.
| | | |
|---|---|---|
| C23C 24/10 | (2006.01) | |
| B23K 26/082 | (2014.01) | |
| B23K 26/342 | (2014.01) | |
| B23K 26/352 | (2014.01) | |
| B23K 103/04 | (2006.01) | |
| B63B 59/04 | (2006.01) | |
| B23K 103/06 | (2006.01) | |

(52) U.S. Cl.
CPC .......... *C23C 24/106* (2013.01); *B23K 26/082* (2015.10); *B23K 26/342* (2015.10); *B23K 26/355* (2018.08); *B23K 26/3576* (2018.08); *B63B 59/04* (2013.01); *B23K 2103/04* (2018.08); *B23K 2103/06* (2018.08)

(58) Field of Classification Search
CPC ................ C23C 24/106; B23K 26/082; B23K 26/342; B23K 26/355; B23K 26/3576; B23K 2103/04; B23K 2103/06; B23K 26/123; B23K 26/1437; B23K 26/1476; B63B 59/04
See application file for complete search history.

(56) References Cited

FOREIGN PATENT DOCUMENTS

| | | | | |
|---|---|---|---|---|
| CN | 104498957 | | 4/2015 | |
| CN | 104498957 A | * | 4/2015 | |
| CN | 105970021 | | 9/2016 | |
| CN | 108823564 | | 11/2018 | |
| CN | 108893735 | | 11/2018 | |
| CN | 108893735 A | * | 11/2018 | ........... C23C 24/106 |
| CN | 208609192 | | 3/2019 | |
| CN | 111172533 | | 5/2020 | |
| WO | 2008097374 | | 8/2008 | |

* cited by examiner

*Primary Examiner* — John P. Dulka
(74) *Attorney, Agent, or Firm* — Piloff Passino & Cosenza LLP; Rachel K. Piloff; Sean A. Passino

(57) ABSTRACT

The invention discloses a method for preparing an anticorrosive surface layer of a metal material in a marine environment by laser, which belongs to the technical field of laser processing. First, the laser cladding method is used to prepare a cladding surface layer on the surface of the metal material that is not easy to undergo chemical substitution reaction with the chlorides (NaCl, $MgCl_2$, $CaCl_2$ etc.) in the seawater. Then, on the surface of the cladding surface layer, ultrafast laser processing is used to form a surface layer with a wetting angle (and water) greater than 90 degrees and with hydrophobic characteristics.

8 Claims, No Drawings

US 11,939,679 B2

METHOD FOR PREPARING AN ANTICORROSIVE SURFACE LAYER OF A METAL MATERIAL IN A MARINE ENVIRONMENT BY LASER

TECHNICAL FIELD

The invention relates to the technical field of laser processing, in particular to a method for preparing an anticorrosive surface layer of a metal material in a marine environment by laser.

BACKGROUND TECHNOLOGY

The marine corrosion environment includes marine atmospheric corrosion environment and seawater corrosion environment. There are many factors that affect the corrosion of metal marine engineering materials in the marine environment. Among them, salinity and adherent marine organisms have a great influence on the corrosion of metal materials. First of all, in the marine environment, the humidity around metal materials is very high, and the salt content of sea water and ocean atmosphere is very high. For example, the proportion of chlorides (NaCl, $MgCl_2$, $CaCl_2$, etc.) in seawater is as high as 88.7%. When marine engineering equipment and the metal materials used in the equipment are in this kind of high-salt and high-humidity marine environment, they will be surrounded by high-humidity water vapor, condensed high salt water on the surface of the material, and then corroded by chemical displacement reaction. Secondly, in the marine environment, the $CO_2$ released by marine organisms attached to the metal materials of marine engineering equipment and equipment makes the surrounding sea water more acidic, and the death and decay of marine organisms can produce acidic substances and $H_2S$, which can accelerate corrosion.

At present, the anti-corrosion measures for marine engineering metal materials mainly include glass fiber reinforced plastics, thermal spraying of corrosion-resistant materials, cathodic protection and other methods. Among them, thermal spraying of corrosion-resistant materials is the most used. However, the above methods are not conducive to forming on metal materials. The hydrophobic surface cannot well solve the problem of adhesion of high humidity and high salt water vapor and sea creatures on the surface of metal materials in the marine environment, and the anti-corrosion effect is not ideal.

SUMMARY OF THE INVENTION

The purpose of the present invention is to provide a method for preparing the anti-corrosion surface layer of metal materials in the marine environment by laser, so as to solve the above-mentioned problems in the prior art. Laser cladding and ultra-fast laser processing are used to form a hydrophobic surface layer with a wetting angle (and water) greater than 90 degrees on the surface of the metal material. The anti-corrosion surface layer has hydrophobic properties and is not easy to undergo chemical substitution reactions with chlorides (NaCl, $MgCl_2$, $CaCl_2$, etc.) in seawater.

In order to achieve the above objectives, the present invention provides the following solutions:

The invention provides a method for preparing an anticorrosive surface layer of a metal material in a marine environment by laser, which comprises the following steps:
(1) Laser cladding technology is used to prepare a cladding surface layer on the surface of metal material.

The metal material is pretreated and dried, and the laser is combined with the coaxial powder feeding method to melt the cladding material and the surface layer of the metal material at the same time, and the cladding surface layer is obtained on the surface of the metal material;
(2) Ultrafast laser processing technology is used to prepare a hydrophobic surface on the cladding surface.

The ultrafast laser is selected from picosecond laser or femtosecond laser, and the pulse width is less than $10^{-11}$ s.

Further, the metal material is steel or cast iron.

Further, the pretreatment method in step (1) is to polish the surface of the metal material and clean the surface with an ethanol solution.

Further, the cladding material is one of gold, chromium or chromium-molybdenum aluminum alloy powder.

Further, the particle size of the cladding material powder is 10-100 μm.

Further, the thickness of the cladding surface layer is 60-200 um.

Further, the power of the laser for cladding is 800-3000 W, the beam spot width is 2-6 mm, and the scanning speed is 5-100 mm/s, the powder feeding rate is 10-40 g/min, and the overlap rate is 20%-55%.

Further, in step (1), argon is used as the protective gas, and the flow rate of argon is 20 L/h.

The present invention discloses the following technical effects:

The present invention first adopts the laser cladding method to coat a cladding surface layer with a thickness of 60-200 um on the surface of the metal material. Then, on the surface of the cladding surface layer, ultrafast laser processing is used to form a surface layer with a wetting angle (and water) greater than 90 degrees and with hydrophobic characteristics. The anti-corrosion surface layer obtained has hydrophobic properties, the high humidity and high salt water vapor and marine organisms in the marine environment are not easy to adhere, and the anti-corrosion surface layer is stable in salt water resistance, and is not easy to undergo chemical substitution reaction with chlorides in seawater (NaCl, $MgCl_2$, $CaCl_2$ etc.), which can achieve high-efficiency anti-corrosion of metal materials in the marine environment.

DESCRIPTION OF THE INVENTION

Various exemplary embodiments of the present invention will now be described in detail. The detailed description should not be considered as a limitation to the present invention, but should be understood as a more detailed description of certain aspects, characteristics, and embodiments of the present invention.

It should be understood that the terms described in the present invention are only used to describe specific embodiments and are not used to limit the present invention. In addition, for the numerical range in the present invention, it should be understood that each intermediate value between the upper limit and the lower limit of the range is also specifically disclosed. Each smaller range between any stated value or intermediate value within the stated range and any other stated value or intermediate value within the stated range is also included in the present invention. The upper and lower limits of these smaller ranges can be independently included or excluded from the range.

Unless otherwise specified, all technical and scientific terms used herein have the same meaning as commonly understood by those skilled in the art in the field of the present invention. Although the present invention only describes preferred methods and materials, any methods and materials similar or equivalent to those described herein can also be used in the practice or testing of the present invention. All documents mentioned in this specification are incorporated by reference to disclose and describe methods and/or materials related to the documents. In case of conflict with any incorporated document, the contents of this specification shall prevail.

Without departing from the scope or spirit of the present invention, various improvements and changes can be made to the specific embodiments of the present specification, which is obvious to those technicians in the art. Other embodiments derived from the description of the present invention will be obvious to the technicians. The specification and examples of this application are only exemplary.

As used herein, "including", "comprising", "having", "containing", etc., are all open terms, which means including but not limited to.

Embodiment 1

(1) Ultrafast laser processing technology is used to prepare a cladding surface layer on the surface of metal material.

The steel surface is polished and cleaned, and then cleaned with ethanol solution and dried. Argon is used as the protective gas. The flow of argon is 20 L/h. The laser with power 800 W is combined with the coaxial powder feeding method. The beam spot width is controlled to 4 mm and the scanning speed is 50 mm/s, the powder feeding rate is 10 g/min, and the overlap rate is 55%. The gold powder with a particle size of 100 μm and the steel surface are melted at the same time, and a cladding surface with a thickness of 200 um is obtained on the steel surface;

(2) Ultrafast laser processing technology is used to prepare a hydrophobic surface on the cladding surface.

The picosecond laser produced by Edgewave™ in Germany has a pulse width of 10 ps, a wavelength of 1064 nm, a repetition rate of 2 MHz, and a power of 100 W. It is equipped with a beam expander, mirror group, and high-speed scanning galvanometer. It is focused by an f-θ field lens with a focal length of 100 mm to form a focal spot with a diameter of 30 μm, and a surface with hydrophobic characteristics can be prepared on the cladding surface.

Embodiment 2

(1) Ultrafast laser processing technology is used to prepare a cladding surface layer on the surface of metal material.

The surface of the cast iron is polished and cleaned, and the surface is cleaned with ethanol solution and dried. Argon is used as the protective gas. The flow of argon is 20 L/h. The laser with power of 1500 W and the coaxial powder feeding method are used to control the beam spot width to 2 mm, and the scanning speed is 5 mm/s, the powder feeding rate is 20 g/min, the overlap rate is 20%, the chromium powder with a particle size of 50 μm and the cast iron surface are melted at the same time, and a 100 um cladding surface layer is obtained on the cast iron surface;

(3) Ultrafast laser processing technology is used to prepare a hydrophobic surface on the cladding surface.

A TruMicro 5050 femtosecond™ laser with a wavelength of 1030 nm, a repetition frequency of 400 kHz, a pulse width of $10^{-11}$ s, and an output power of 4 W is used for focusing on the focal plane, and a scanning galvanometer with a spot size of about 30 μm and a focal length of 100 mm is used in the cladding surface layer, the vertical and horizontal crossing lines with a pitch of 30 μm are scanned, which has hydrophobic properties.

Embodiment 3

(1) Laser cladding technology is used to prepare a cladding surface layer on the surface of metal material.

The surface of the cast iron is polished and cleaned, the surface is cleaned with ethanol solution and dried, argon is used as the protective gas, the flow rate of argon is 20 L/h. The laser with 3000 W power is combined with the coaxial powder feeding method to control the beam spot width to 6 mm and the scanning speed. It is 50 mm/s, the powder feeding rate is 40 g/min, and the overlap rate is 30%. The chromium-molybdenum-aluminum alloy powder with a particle size of 10 μm and the surface of the cast iron are melted simultaneously, and a cladding surface layer of 60 um thickness is obtained on the surface of the cast iron.

(2) Ultrafast laser processing technology is used to prepare a hydrophobic surface on the cladding surface.

The ultrafast titanium sapphire laser amplifier with a center wavelength of 800 nm has a repetition frequency of 1 kHz, a pulse width of 100 fs, a scanning speed of 0.8 mm/s, a focal length of 200 mm, a focal spot of 30 μm, an adjacent scanning distance of 50 μm, and an energy of 50 μJ. The ultrafast titanium sapphire laser amplifer can be prepared with a hydrophobic surface on the cladding surface.

Comparative Example 1

The difference from Embodiment 3 is that only the metal material is laser cladding, not ultra-fast laser processing, and the processing parameters are the same as in Embodiment 3.

The metal materials with anti-corrosion surface layer obtained in Embodiments 1-3 and Comparative Example 1 are tested for performance, and the results are shown in Table 1.

TABLE 1

| Test items | Performance | Embodiment 1 | Embodiment 2 | Embodiment 3 | Comparative example 1 |
| --- | --- | --- | --- | --- | --- |
| Salt spray resistance | ≥500 h, no blistering, no shedding, no corrosion | Pass | Pass | Pass | 30% of the area rusted |
| Salt water resistance (3% NaCl solution) | ≥480 h, no blistering, no shedding, no corrosion | Pass | Pass | Pass | 55% of the area blistered |

TABLE 1-continued

| Test items | Performance | Embodiment 1 | Embodiment 2 | Embodiment 3 | Comparative example 1 |
|---|---|---|---|---|---|
| Self-corrosion potential (mV) | — | −756 | −763 | −754 | −853 |
| Wetting angle | ≥90° | 95° | 97° | 98° | 52° |

The invention adopts the laser cladding technology to prepare the anticorrosive surface layer on the surface of the metal material. Under the conditions of specific spot width, scanning speed, etc., the technology effectively avoids pores in the surface layer, prevents surface layer cracking, and ensures the compactness of the surface layer. Then, a hydrophobic surface is prepared on the cladding surface by ultrafast laser processing technology, and finally a hydrophobic anticorrosive surface layer is obtained. The surface layer has excellent salt spray and salt water resistance, is not easy to undergo chemical substitution reaction with chlorides in seawater (NaCl, $MgCl_2$, $CaCl_2$ etc.), and its self-corrosion potential can reach −754 mV, so as to achieve high-efficiency anti-corrosion of metal materials in the marine environment.

The above-mentioned embodiments only describe the preferred mode of the present invention, and do not limit the scope of the present invention. Without departing from the design spirits of the present invention, those of ordinary technicians in the art have made various contributions to the technical solutions of the present invention. Variations and improvements should fall within the protection scope determined by the claims of the present invention.

The invention claimed is:

1. A method for preparing an anticorrosive surface layer of a metal material in a marine environment by laser, which is characterized in that it comprises the following steps:
 (Step 1) a laser cladding technology is used to prepare a cladding surface layer on the surface of metal material, wherein the metal material is pretreated and dried, and the laser is combined with a coaxial powder feeding method to melt a cladding material and the surface layer of the metal material at the same time, and the cladding surface layer is obtained on the surface of the metal material;
 (Step 2) an ultrafast laser processing technology is used to prepare a hydrophobic surface on the cladding surface, wherein the ultrafast laser is selected from picosecond laser or femtosecond laser, and he a pulse width is less than 10-11s.

2. The method of claim 1 is characterized in that the metal material is steel or cast iron.

3. The method of claim 1 is characterized in that the pretreatment method in step (1) is to polish the surface of the metal material and clean the surface with an ethanol solution.

4. The method of claim 1 is characterized in that the cladding material is one of gold, chromium or chromium-molybdenum aluminum alloy powder.

5. The method of claim 4 is characterized in that the a particle size of the cladding material powder is 10-100 μm.

6. The method of claim 1 is characterized in that thea thickness of the cladding surface layer is 60-200 μm.

7. The method of claim 1 is characterized in that a power of the laser for cladding is 800-3000 W, a beam spot width is 2-6 mm, and a scanning speed is 5-100 mm/s, the powder feeding rate is 10-40 g/min, and the overlap rate is 20%-55%.

8. The method of claim 1 is characterized in that, in step (1), argon is used as a protective gas with a flow rate of argon is 20 L/h.

* * * * *